United States Patent
Antoni et al.

(10) Patent No.: US 11,167,841 B2
(45) Date of Patent: Nov. 9, 2021

(54) UMBRELLA-FOLDING AIRCRAFT UNDERCARRIAGE

(71) Applicant: SAFRAN LANDING SYSTEMS, Velizy Villacoublay (FR)

(72) Inventors: Nicolas Antoni, Moissy-Cramayel (FR); Vincent Raimbault, Moissy-Cramayel (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 413 days.

(21) Appl. No.: 16/375,367

(22) Filed: Apr. 4, 2019

(65) Prior Publication Data
US 2019/0308720 A1   Oct. 10, 2019

(30) Foreign Application Priority Data

Apr. 4, 2018   (FR) ...................................... 18 52932

(51) Int. Cl.
*B64C 25/12* (2006.01)
*B64C 25/36* (2006.01)
(Continued)

(52) U.S. Cl.
CPC .............. *B64C 25/12* (2013.01); *B64C 25/34* (2013.01); *B64C 25/36* (2013.01); *B64C 25/60* (2013.01)

(58) Field of Classification Search
CPC ......... B64C 25/12; B64C 25/34; B64C 25/60; B64C 25/36; B64C 25/10; B64C 25/58
See application file for complete search history.

(56) References Cited

U.S. PATENT DOCUMENTS 2,578,200 A * 12/1951 Nicholl ................... B64C 25/44
244/104 R
2,579,180 A * 12/1951 Eldred ..................... B64C 25/12
244/104 FP
(Continued)

FOREIGN PATENT DOCUMENTS

| EP | 0631929 A1 * | 1/1995 | ............. B64C 25/34 |
| EP | 0631929 A1 | 1/1995 | |
| WO | 2011/157807 A1 | 12/2011 | |

OTHER PUBLICATIONS

Translation of EP-0631929-A1 (Year: 1995).*
French Search Report for corresponding applic. No. FR1852932 dated Sep. 12, 2018.

*Primary Examiner* — Richard R. Green
*Assistant Examiner* — Steven J Shur
(74) *Attorney, Agent, or Firm* — Sughrue Mion, PLLC

(57) ABSTRACT

An aircraft undercarriage carrying at least two wheels (4) and for mounting on an aircraft structure to be movable between a deployed position and a retracted position, the undercarriage being characterized in that the wheels are rotatably mounted on axles (3) carried by arms (2) hinged to a bottom portion of a strut-leg (1) of the undercarriage, each arm being associated with a shock absorber (5) coupled firstly to the arm and secondly to a collar (6) that extends around the strut-leg and that is mounted to slide on the strut-leg between a high position in which the collar bears against an abutment (7) of the strut-leg when the undercarriage is in the deployed position and a low position into which the collar is taken when the undercarriage is moved from the deployed position to the retracted position, so as to bring the wheels closer together.

8 Claims, 4 Drawing Sheets

(51) Int. Cl.
*B64C 25/34* (2006.01)
*B64C 25/60* (2006.01)

(56) References Cited

U.S. PATENT DOCUMENTS

| | | | |
|---|---|---|---|
| 2,811,326 A | 10/1957 | Westcott, Jr. | |
| 2,960,289 A * | 11/1960 | Westcott, Jr. | ........... B64C 25/34 |
| | | | 244/104 R |
| 2,997,261 A * | 8/1961 | Westcott, Jr. | ........... B64C 25/34 |
| | | | 244/103 R |
| 9,073,629 B2 * | 7/2015 | Ducos | ..................... B64C 25/10 |
| 2013/0140399 A1 * | 6/2013 | Ducos | ..................... B64C 25/10 |
| | | | 244/104 FP |

\* cited by examiner

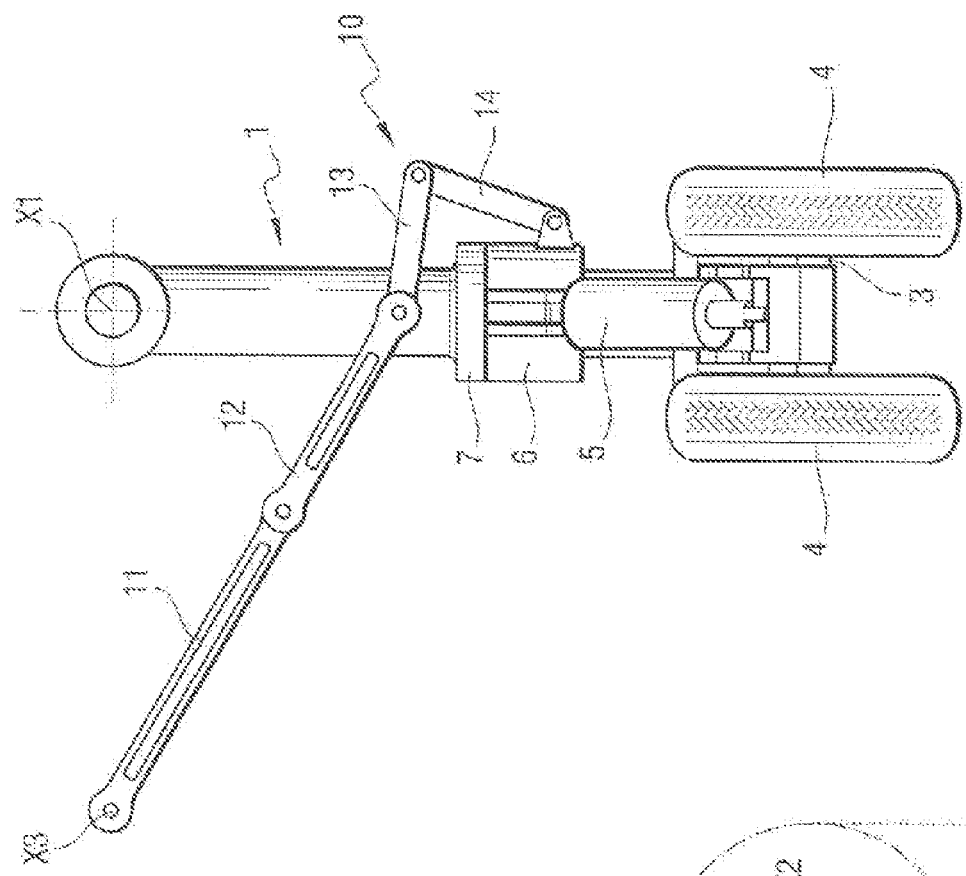
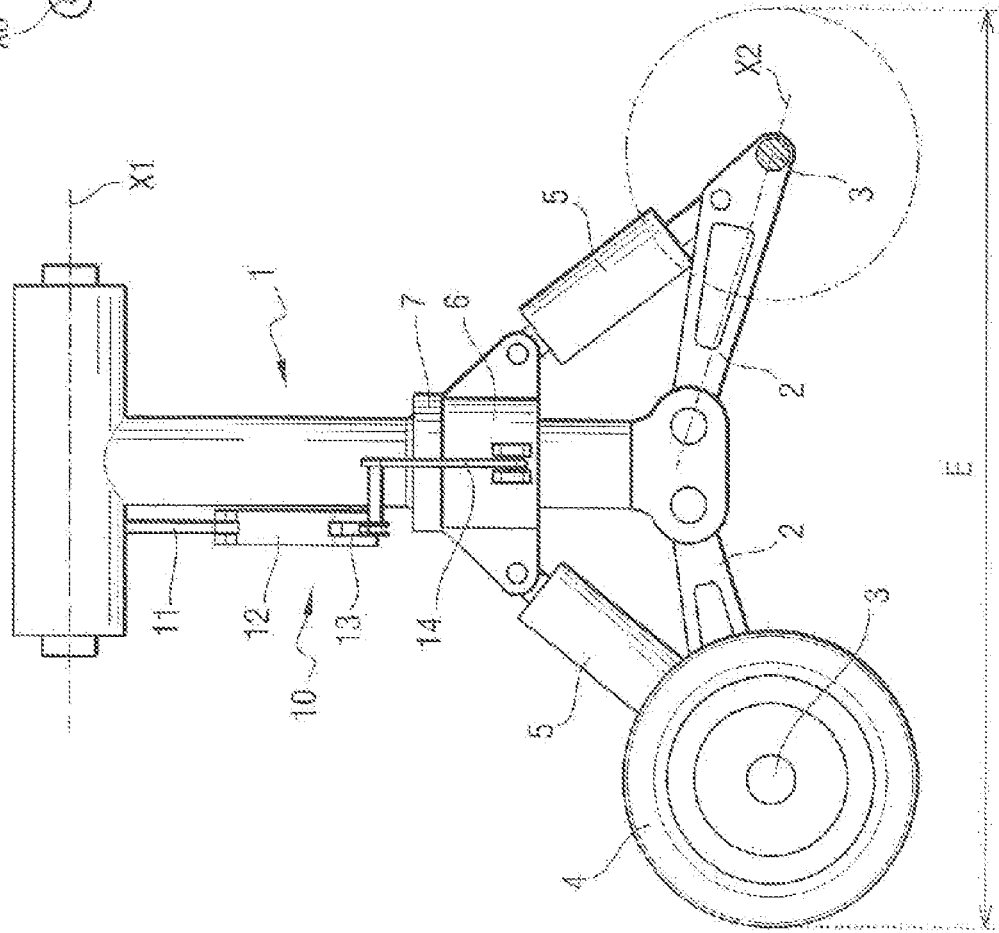
Fig. 1
Fig. 2

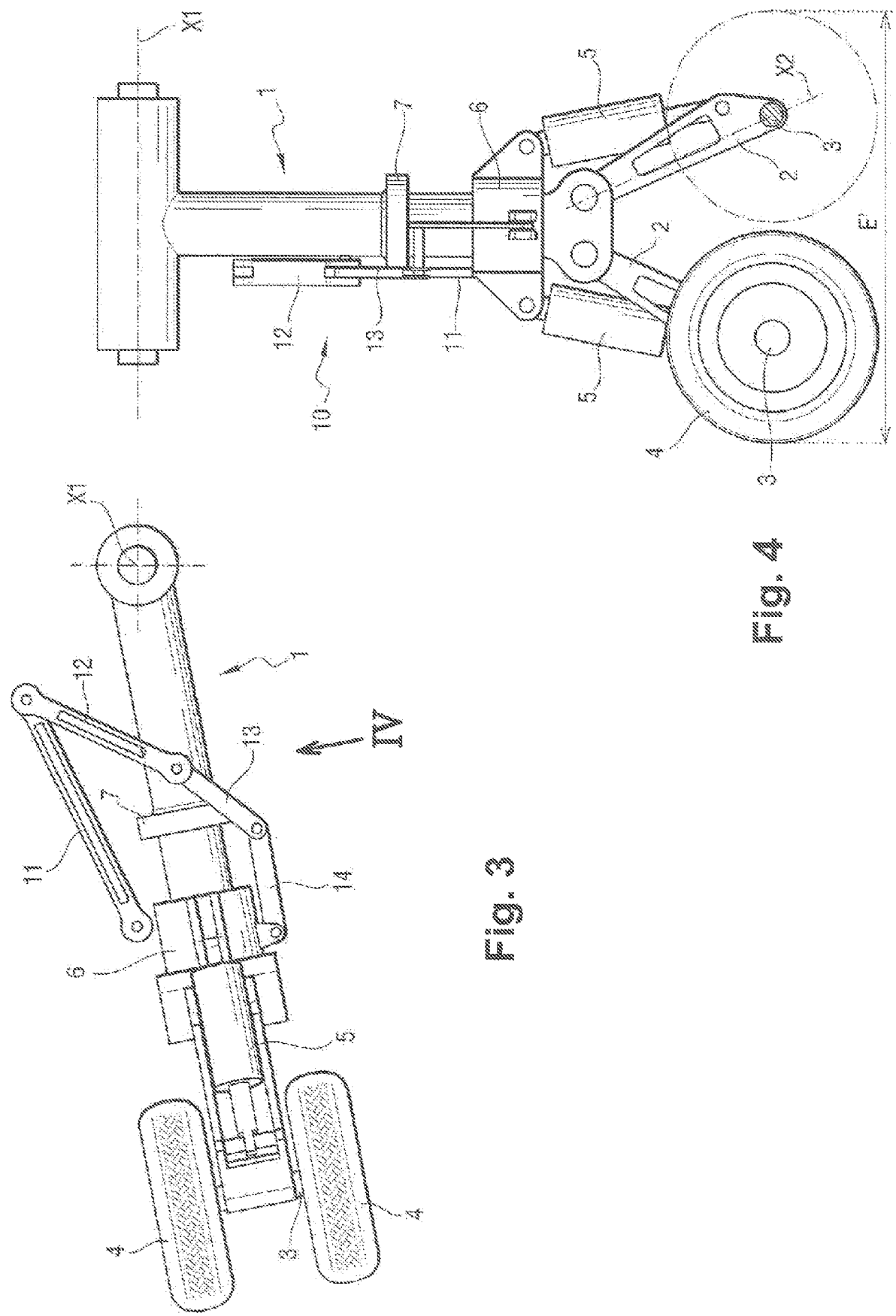

UMBRELLA-FOLDING AIRCRAFT UNDERCARRIAGE

The invention relates to an aircraft undercarriage of spread that can be reduced in the retracted position in order to facilitate storing it in a wheel well.

BACKGROUND OF THE INVENTION

Undercarriages are known that are mounted to move on an aircraft between a deployed position and a retracted position and that include a plurality of wheels, in particular undercarriages having a bogey for carrying four or more wheels. In particular when they include braked wheels, such undercarriages are wide and occupy a large volume in a wheel well when retracted.

OBJECT OF THE INVENTION

The invention seeks to propose an aircraft undercarriage of spread that can be reduced on being retracted in order to facilitate storing it in a wheel well.

SUMMARY OF THE INVENTION

In order to achieve this object, there is provided an aircraft undercarriage carrying at least two wheels and for mounting on an aircraft structure to be movable between a deployed position and a retracted position. According to the invention, the wheels are rotatably mounted on axles carried by arms hinged to a bottom portion of a strut-leg of the undercarriage, each arm being associated with a shock absorber coupled firstly to the arm and secondly to a collar that extends around the strut-leg and that is mounted to slide on the strut-leg between a high position in which the collar bears against an abutment of the strut-leg when the undercarriage is in the deployed position and a low position into which the collar is taken when the undercarriage is moved from the deployed position to the retracted position, so as to bring the wheels closer together.

When the undercarriage is in the deployed position and the aircraft is on the ground, the forces coming from the wheels are transmitted to the collar, while being filtered by the shock absorbers, with the collar transmitting these forces to the strut-leg via the abutment. Bringing the collar into the low position while moving the undercarriage towards the retracted position moves the wheels closer to the central axis of the strut-leg, thereby reducing the spread of the undercarriage, and thus making it easier to store it in flight in a wheel well of the aircraft.

According to a particular aspect of the invention, the collar is connected by a link to a brace member comprising two hinged-together elements for stabilizing the undercarriage in the deployed position.

In the deployed position, the two elements of the brace member are held in an aligned position, thereby stabilizing the strut-leg. The link holds the collar in the high position, in the immediate proximity of or bearing against the abutment of the strut-leg. While moving the undercarriage towards the retracted position, the two elements of the brace member are taken out of alignment, and use is made of the movement of one of these two elements relative to the strut-leg to cause the link to push the collar towards the low position, thereby moving the wheels closer together and reducing the spread of the undercarriage. Thus, there is no need for any specific actuator nor for any locking of the collar. During the deployment movement, the link pulls on the collar in order to return it to the high position, thereby splaying apart the wheels and returning them to their landing position.

DESCRIPTION OF THE FIGURES

The invention can be better understood in the light of the following description of particular embodiments of the invention given with reference to the figures of the accompanying drawings, in which:

FIG. 1 is a side view of an undercarriage having four wheels and two arms in a particular embodiment of the invention, and shown in a deployed position while the aircraft is in flight;

FIG. 2 is a front view of the FIG. 1 undercarriage;

FIG. 3 is a front view of the FIG. 1 undercarriage in the retracted position;

FIG. 4 is a view of the undercarriage when it is in the retracted position and as seen when looking along arrow IV in FIG. 3;

DETAILED DESCRIPTION OF THE INVENTION

Figure 6:
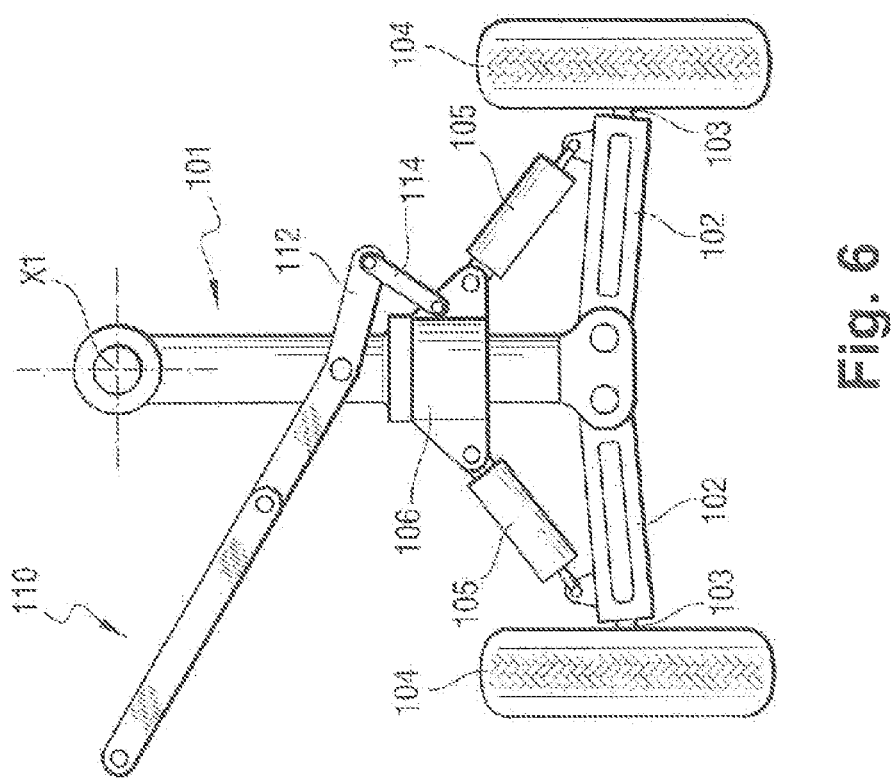
FIG. 6 is a front view of the FIG. 5 undercarriage shown in the deployed position while the aircraft is on the ground.

In accordance with a first particular embodiment of the invention, as shown in FIGS. 1 to 4, the undercarriage shown comprises a strut-leg 1 hinged to the structure of an aircraft about an axis X1 so that the undercarriage can move between a deployed position as shown in FIGS. 1 and 2, and a retracted position as shown in FIGS. 3 and 4. The drive actuator is not shown for greater clarity. The bottom portion of the strut-leg 1 has two arms 2 hinged thereto about axes X2 that are substantially horizontal when the undercarriage is in the deployed position. In this example, the arms 2 extend forwards and rearwards relative to a direction of advance of the aircraft. In this example, each of the arms 2 carries an axle 3 for rotatably receiving two wheels 4 (the wheels of one of the axles being omitted in FIGS. 1 and 4 for greater clarity). Shock absorbers 5 are coupled respectively between each of the arms 2 and a collar 6 extending around the strut-leg 1 in order to absorb the vertical kinetic energy of the aircraft on landing and in order to filter out ground irregularities while taxiing.

In the invention, the collar 6 is mounted to slide on the strut-leg 1 between a high position as shown in FIGS. 1 and 2, in which the collar 6 bears against a high abutment 7 of the strut-leg 1, and a low position as shown in FIGS. 3 and 4. Sliding of the collar 6 during the retraction movement has the effect of causing the spread E of the undercarriage when in the deployed position to pass to a spread E' that is smaller when in the retracted position by moving the wheels closer together, thereby making the undercarriage in the retracted position easier to store in the wheel well.

The collar 6 may be moved by any actuator means, in particular by a dedicated actuator, which would require an actuation sequence. In a particular provision of the invention, shown in this example, use is made of the relative movement between one of the elements of a brace member 10 of the strut-leg 1 for the purpose of moving the collar 6. More precisely, in this example the brace member is a folding brace comprising two hinged-together elements 11 and 12, the first element 11 being hinged to the structure of the aircraft about axis X3 and the second element 12 being hinged to the strut-leg. These two elements 11, 12 come into alignment when the undercarriage is in the deployed position and they are held in alignment by a stabilizer member (not shown). The collar 6 is coupled to a horn 13 of the second brace element 12 by means of a link 14 in such a manner that in the deployed position, the link 14 constrains the collar 6 to be in the immediate proximity of or against the abutment 7 of the strut-leg 1. A resilient member or a slot mechanism may be provided between the link 14 and the collar 6 so that forces coming from the wheels bearing against the ground urge the collar 6 against the abutment 7 without giving rise to forces in the brace member 10 that subject it to stress pointlessly.

When moving the undercarriage towards the retracted position, as shown in FIGS. 3 and 4, the elements 11 and 12 of the brace member 10 are taken out of alignment, causing the second element 12 to turn relative to the strut-leg 1. This movement causes the collar 6 to slide under thrust from the link 14 towards its low position on the strut-leg 1. This sliding has the effect of moving the wheels 4 closer together, thereby reducing the spread of the undercarriage. The collar 6 being moved and held by the brace member 10 makes it possible to omit any dedicated actuator member, or indeed any member for locking the collar.

Figure 5:
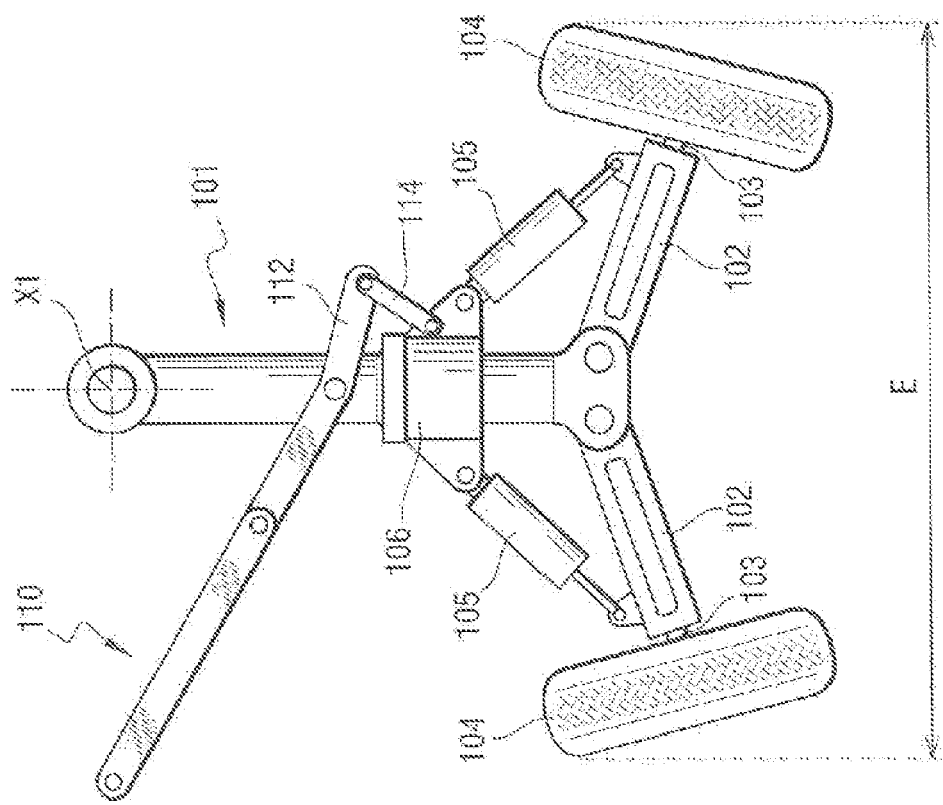
FIG. 5 is a front view of an undercarriage having two wheels and two arms in a second particular embodiment of the invention, and shown in the deployed position while the aircraft is in flight.
Figure 7:
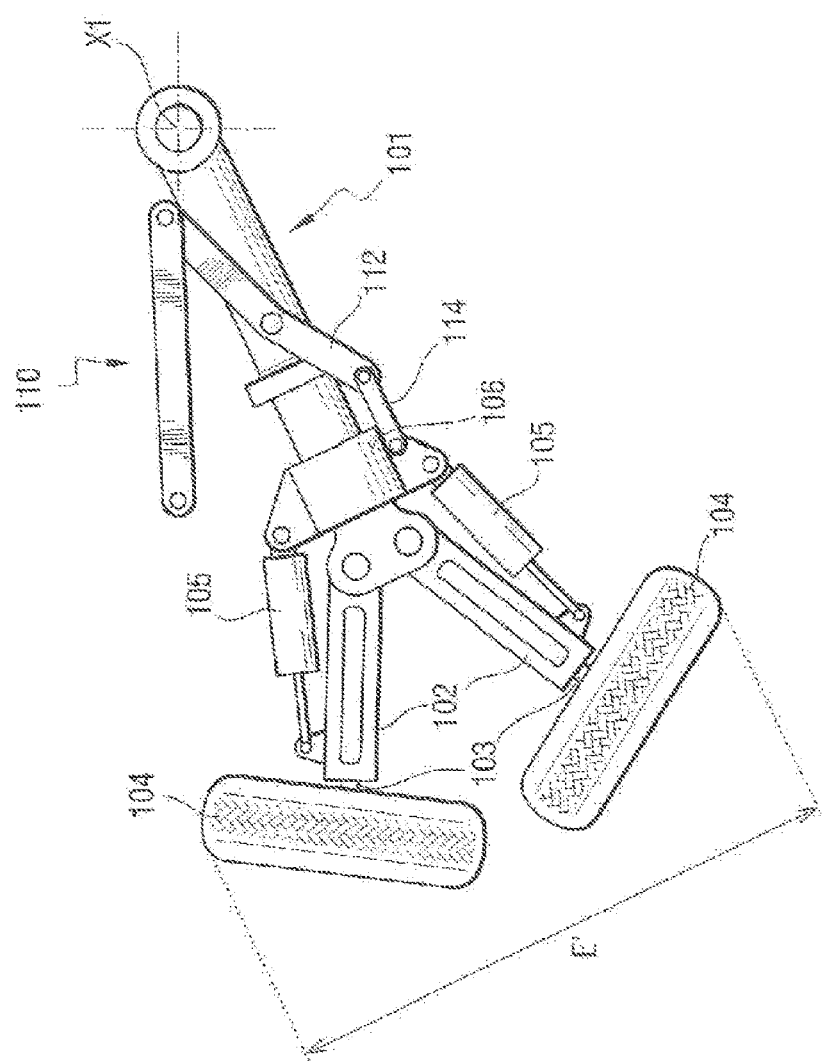
FIG. 7 is a front view of the FIG. 5 undercarriage shown in the retracted position.

In a second particular embodiment of the invention, as shown in FIGS. 5 to 7, where references to elements that are common with the above-described embodiment are increased by one hundred, the strut-leg 101 is still hinged to the structure of the aircraft about an axis X1. In this example it carries two arms 102 that are hinged to the bottom portion of the strut-leg 101, but that extend laterally relative to the direction of advance of the aircraft. In this example, each of the arms 102 carries an axle 103 rotatably carrying a single wheel 104. In the deployed position in flight, as shown in FIG. 5, the planes of the wheels are oblique; however, as shown in FIG. 6, they straighten up on the ground once the shock absorbers are compressed under the effect of the weight of the aircraft. Shock absorbers 105 are coupled to the arms 102 and to a collar 106 that is mounted to slide on the strut-leg 101. As above, the collar 106 is held in its high position when the undercarriage is in the deployed position, and it is returned to its low position when the undercarriage is in the retracted position, thereby having the effect of reducing the spread of the undercarriage. The position of the collar 106 is also controlled by the element 112 of the brace member 110, which is hinged to the strut-leg 101 by means of a link 114 coupled to the element 112 and to the collar 106 for actuation in the same manner.

Figure 8:
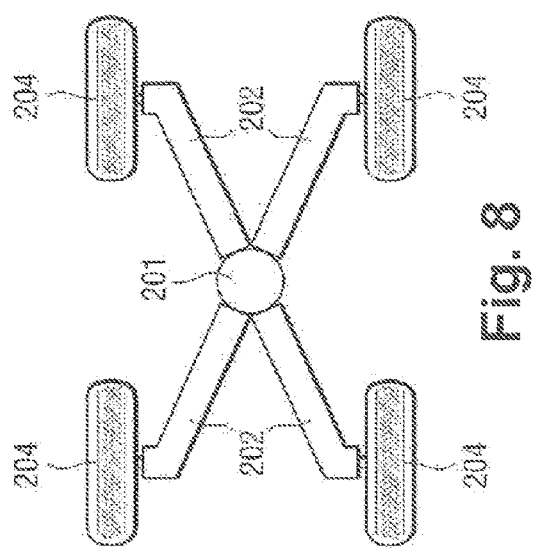
FIG. 8 is a diagrammatic plan view of an undercarriage having four wheels and four arms, in a third particular embodiment of the invention.
Figure 9:
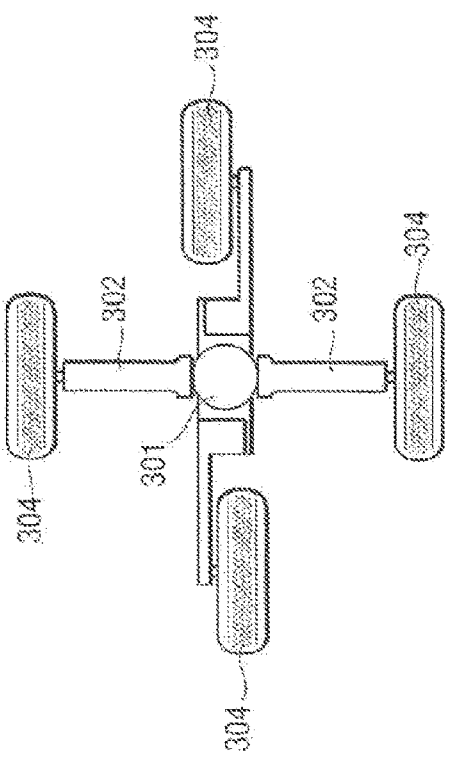
FIG. 9 is a diagrammatic plan view of an undercarriage having four wheels and four arms, in a fourth particular embodiment of the invention.

The invention is applicable to any type of wheel arrangement on the undercarriage. FIGS. 8 and 9 show the invention applied to undercarriages having four wheels 204, 304, each of which is carried by a respective arm. In FIG. 9, two of the arms 302 extend longitudinally and two of the arms 302 extend laterally relative to a direction of advance of the aircraft so as to place the wheels 304 in a cross-configuration. The hinge axes of the arms 303 on the bottom of the strut-leg 301 are still substantially horizontal when the undercarriage is in the deployed position, and they extend longitudinally and laterally relative to the direction of advance of the aircraft. In FIG. 8, the arms 302 extend in directions that are oblique relative to the direction of advance of the aircraft in order to provide arms in a cross-configuration that leads to the wheels 204 being in a configuration that is more conventional, i.e. like that of a four-wheel bogey. The hinge axes of the arms 302 on the bottom of the strut-leg 201 are still substantially horizontal when the undercarriage is in the deployed position, and they extend obliquely relative to a direction of advance of the aircraft. Naturally, the invention may be applied to an undercarriage having six wheels.

In a practical provision, the collar is made out of two parts that are assembled together around a cylindrical portion of the strut-leg. Advantageously, the collar is connected in such a manner as to be capable of sliding without any possibility of turning, e.g. by using a non-circular profile for the cylindrical portion of the strut-leg on which the collar slides.

The invention is not limited to the description above, but on the contrary covers any variant coming within the ambit defined by the claims. In particular, the invention may be applied to an undercarriage leg that is braced by two braces. Furthermore, the collar may be controlled independently of the brace(s). The collar may be held in its high or low position and it may be moved between those positions by any means. In particular, it is possible to use a dedicated actuator and locking means, or indeed to make use of the relative movement between the structure of the aircraft and the strut-leg while the undercarriage is being moved from the deployed position to the retracted position, e.g. by using a connecting rod hinged firstly to the structure of the aircraft and secondly to the collar. In general manner, any other relative movement enabling the collar to move from the high position to the low position could be used. The connection between the collar and the element having the relative movement that is used for moving the collar may be provided by any mechanical means, such as a link or a rack.

The invention claimed is:

1. An aircraft undercarriage carrying at least two wheels (4; 104; 204; 304) and for mounting on an aircraft structure to be movable between a deployed position and a retracted position, the undercarriage being characterized in that the wheels are rotatably mounted on axles (3; 103) carried by arms (2; 102; 202; 302) hinged to a bottom portion of a strut-leg (1; 101; 201; 301) of the undercarriage, each arm being associated with a shock absorber (5; 105) coupled firstly to the arm and secondly to a collar (6; 106) that extends around the strut-leg and that is mounted to slide on the strut-leg between a high position in which the collar bears against an abutment (7; 107) of the strut-leg when the undercarriage is in the deployed position and a low position into which the collar is taken when the undercarriage is moved from the deployed position to the retracted position, so as to bring the wheels closer together.

2. An undercarriage according to claim 1, wherein the collar (6; 106) is connected to an element (12; 112) of a brace member (10; 110) of the undercarriage in such a manner that the collar is moved by the effect of relative movement between the strut-leg and the element of the brace member.

3. An undercarriage according to claim 2, wherein the collar (6; 106) is connected by a link (14; 114) to the element (12; 112) of the brace member that is hinged to the strut-leg (1; 101).

4. An undercarriage according to claim 1, wherein the collar is made of two parts and is assembled around a cylindrical portion of the strut-leg.

5. An undercarriage according to claim 1, wherein the arms (2) are two in number and they extend longitudinally relative to a direction of advance of the aircraft, each arm carrying two wheels (4).

6. An undercarriage according to claim 1, wherein the arms (102) are two in number and they extend laterally relative to a direction of advance of the aircraft, each of them carrying one wheel (102).

7. An undercarriage according to claim 1, wherein the arms (302) are four in number and each carries one wheel (304), two arms (302) extending longitudinally and two arms (302) extending laterally relative to a direction of advance of the aircraft in a cross-configuration.

8. An undercarriage according to claim 1, wherein the arms (202) are four in number and each carries one wheel (204), the arms extending obliquely relative to a direction of advance of the aircraft in a cross-configuration.

\* \* \* \* \*